Dec. 17, 1957     J. A. LABBEE, JR     2,816,473
FASTENING DEVICE HAVING A LOCK CAVITY FOR A SCREW DRIVER
Filed June 24, 1952

INVENTOR.
Joseph A. Labbee Jr
BY Nathaniel Frucht
ATTORNEY

United States Patent Office 2,816,473
Patented Dec. 17, 1957

2,816,473

FASTENING DEVICE HAVING A LOCK CAVITY FOR A SCREW DRIVER

Joseph A. Labbee, Jr., Providence, R. I.; Katherine G. Labbee administratrix of said Joseph A. Labbee, Jr., deceased Application June 24, 1952, Serial No. 295,163

2 Claims. (Cl. 85—45)

The present invention relates to metal screws and the like and has particular reference to a novel construction therefor.

The principal object of the invention is to provide a screw head for a conventional screw or the like which has a lock cavity for a screw driver.

Another object of the invention is to provide a screw head for a conventional screw or the like which has a positive gripping cavity for receiving a screw driver.

Still another object of the invention is to provide a conventional screw or the like with a screw driver locking pin.

An additional object of the invention is to provide a screw head for a conventional screw or the like which has screw driver guiding elements.

Another object of the invention is to provide a screw head having a mounting for an ornamental object.

An additional object of the invention is to provide a screw which can be securely held by the screw driver alone when the screw is being placed in position for driving into a body.

Yet another object of the invention is to provide a novel screw which contains less material than conventional type screws.

With the above and other objects and advantageous features in view, the invention consists of a novel arrangement of parts more fully disclosed in the detailed description following, in conjunction with the accompanying drawings, and more specifically defined in the claims appended thereto.

It has been found desirable to form the head of a conventional screw or the like with a central cavity of increasing diameter so that the head of a flexible type screw driver can be inserted and locked within the head to provide a firm grip for driving and removing the screw from a wooden, metal or plastic body. It has also been found advantageous to provide a head for a fastening device which can be positively gripped and which has securing means for detachably mounting an ornamental insert. To this end, I first machine a cylindrical solid piece of metal with a spiral screw at one end, leaving the other end blank to provide a shank for a screw head, the top of the shank being milled to leave a central upstanding projection. I then machine a screw head with the base diameter equal to the diameter of the top of the shank, punch or cut a generally square hole centrally through the screw head, the hole being shaped with the inner walls diverging outwardly from top to bottom. I then weld the screw head in inverted position to the top of the shank with the base of the screw head secured to the shank and the shank projection extending into the cavity. The result is a screw having a head with an inwardly enlarged cavity. The cavity has a square opening large enough to receive the head of a screw driver of the type which has a split tongue. When the tongue of such a screw driver is pushed down into the cavity, it is spread by the upstanding central projection, whereby it becomes securely locked therein. In this position the screw driver is ready to be operated for driving or for removing the screw. To detach the screw driver from the screw, the operator simply pulls back on the screw driver handle, the tongue contracting due to the cavity walls converging upwardly.

Figure 1:
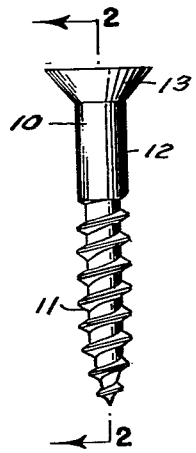
Fig. 1 is a perspective view of a screw embodying the invention.
Figure 2:
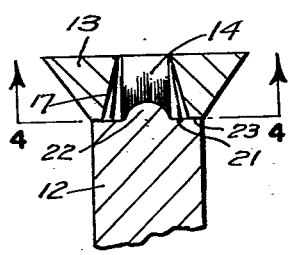
Fig. 2 is a partial cross section on the line 2—2 of Fig. 1.

Referring to the drawings, the screw 10 shown in Fig. 1 has a lower threaded portion 11, a shank 12 and a head 13. The head 13 is in the shape of a horizontally truncated cone segment, and has a cavity 14, see Figs. 2 and 3, which is centrally located. The top of the cavity is square and forms a restricted inlet 15 into the lower portion 16 of the cavity which is cross slotted as shown in Fig. 4, the walls 17, converging upwardly to the top surface and diverging downwardly to the bottom surfaces of the head and having intermediate pyramidal projecting ribs 20 which serve as abutments for an inserted screw driver tongue. The top 21 of the shank has a central upstanding spreader 22, which projects into the cavity 14 in spaced relation to the slot walls, a flat shoulder 23 on the shank top serving as the base to receive the lower surface of the head for welding the head to the shank.

In making the novel screw, a cylindrical piece of solid metal of any desired diameter is cut to a length slightly in excess to the desired length of the screw. At one end portion screw threads are cut as illustrated, while at the other end the top is formed so that the central abutment projects upwards from the top surrounded by the flat shoulder, as described. This abutment has a diameter and length which is determined by the cavity space within the screw head as indicated below.

Figure 3:
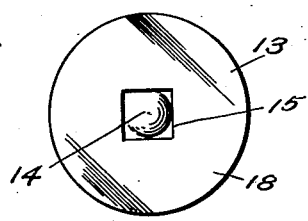
Fig. 3 is a top plan view of Fig. 2.
Figure 4:
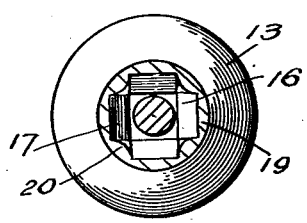
Fig. 4 is a bottom view of the screw head, on the line 4—4 of Fig. 2.

The screw head is formed by taking a piece of metal of a desired thickness and forming it so that the top surface 18 is flat and circular as shown in Fig. 3, the bottom surface 19 is flat, circular and of the same diameter as the cylindrical shank piece as shown in Fig. 4, and the connecting side between the top and the bottom is conical as shown in Fig. 1. A square hole is then punched through the head as shown in Fig. 3, and the walls of the hole are then cut to converge towards each other at the top surface, resulting in the cavity formation illustrated in Figs. 2 to 4.

The screw head is then placed on the shank top with the bottom of the screw head seated on the shoulder of the shank top and the abutment projecting upwards through the center of the cavity in spaced relation to the walls. The head and the shank are then welded together to form the novel screw.

This method of manufacture results in a very solid and substantial screw which has no cross slot and instead has an expanding screw driver tongue receiving cavity.

Figure 5:
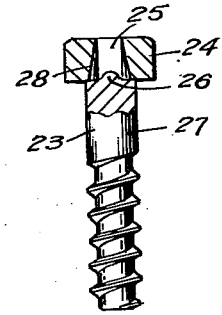
Fig. 5 is a perspective view of a bolt, particularly in cross section, showing a head construction embodying the invention.

Fig. 5 shows a bolt 23 with a head 24 of generally uniform thickness, having a cavity 25 shaped similarly to the cavity 14, and a spreader 26 centrally located on the shank 27 and projecting into the cavity 25 in spaced relation to the upwardly converging slotted walls 28 of the cavity, the head and shank being manufactured as described above, and welded together.

Figure 6:
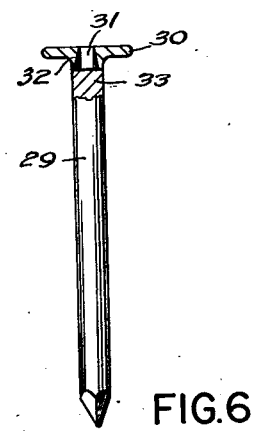
Fig. 6 is a perspective view of a nail, partly in cross section, showing a head construction embodying the invention.

Fig. 6 shows a nail 29 with a head 30 of generally uniform thickness, having a cavity 31 also shaped similar to the cavity 14, and with inwardly spreading walls 32, the nail head being preferably made separately and welded to the upper end of the shank 33.

A screw driver with a split tongue is used to either drive or withdraw the screw or bolt shown in Figs. 1 and 5 respectively, by inserting the tongue through the restricted inlet of the cavity and forcing it down into the lower portion where it comes in contact with the spreader which spreads the tongue so that the tongue portions become positioned against the walls and between the projecting ribs. In this position the screw driver is securely locked to the screw head, the projecting ribs serving as abutments to prevent slipping as the screw driver is turned.

Figure 7:
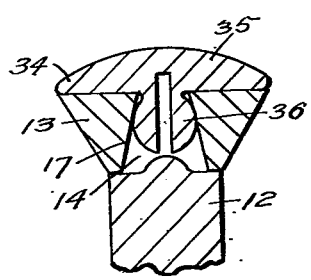
Fig. 7 is a cross sectional view of the top of a screw with an ornamental head mounted thereon.
Figure 8:
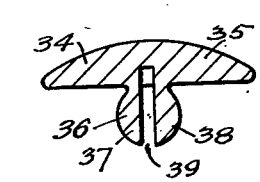
Fig. 8 is a cross sectional view of the ornamental head of Fig. 7.
Figure 9:
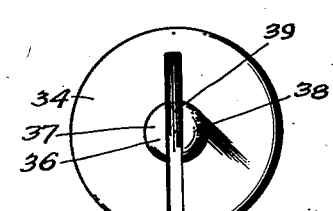
Fig. 9 is a bottom plan view of Fig. 8.

The expanding fastener head cavity lends itself to the attachment of ornamental objects to the head of the fastener as shown in Fig. 7, which illustrates the screw of Fig. 1. Such as arnament 34, see Fig. 8, includes an ornamental head portion 35 and a snap element 36. The snap element is preferably spherical as shown in Fig. 9, and is shaped to snap into the cavity as shown in Fig. 7, and has two resilient jaw portions 37 and 38 separated from each other by a narrow slot 39 which extends into the head 35, the jaws being forced towards each other when the snap element is inserted within the cavity inlet and springing back to the original position after the snap element is completely inserted within the cavity, whereby the snap element becomes firmly locked within the cavity as shown in Fig. 7, but may be removed if desired. The ornamental member may be of any suitable material, shape, and color.

It is now clear that the novel fastener head construction has many advantages over conventional types. A screw driver inserted to drive or withdraw the screw will hold the screw firmly attached, and prevent the screw from dropping. Once the screw driver head is inserted within the cavity, slipping of the screw driver from the screw and breaking of the head is prevented. The metal necessary to make a screw is much less than otherwise, as there is no substantial loss of stock in forming the shank, and less material is needed for the head, thereby saving metal and reducing cost. Lastly, the cavity lends itself to ornamental attachments which serve to conceal the fastener, and the cavity may be used as a holding recess for certain uses, such as hanging pictures and the like.

Although I have described a specific constructional embodiment of my invention, it is obvious that changes in the size, shape and arrangement of the parts may be made to meet different constructional requirements, without departing from the spirit and the scope of the appended claims.

I claim:

1. A fastening device having an elongated shank and a head, said head having a central cavity in longitudinal alignment with the shank, said cavity having a square inlet, a base, and two pairs of opposed flat walls, of uniform width the walls diverging downwardly from the inlet opening to the base, the base of the cavity having a centrally disposed spreader projection of limited height, and the cavity further having ribs between contiguous wall edges projecting inwardly and extending to the cavity base.

2. A fastening device having an elongated shank and a head, said head having a central cavity in longitudinal alignment with the shank, said cavity having a square inlet, a base and two pairs of opposed flat walls of uniform and equal width diverging downwardly from the inlet to the base, said base having a spreader projection of limited height, said spreader projection being domed.

References Cited in the file of this patent

UNITED STATES PATENTS

| Number | Name | Date |
|---|---|---|
| 161,390 | Cummings | Mar. 30, 1875 |
| 848,003 | Braunschweig | Mar. 26, 1907 |
| 915,068 | Bowen | Mar. 16, 1909 |
| 975,285 | Robertson | Nov. 8, 1910 |
| 1,909,147 | Flynn | May 16, 1933 |
| 2,182,092 | O'Leary | Dec. 5, 1939 |
| 2,304,704 | O'Leary | Dec. 8, 1942 |
| 2,362,999 | Hewitt | Nov. 21, 1944 |
| 2,627,778 | Hodell | Feb. 10, 1953 |
| 2,631,624 | Wright | Mar. 17, 1953 |

FOREIGN PATENTS

| 18,027 | Great Britain | Apr. 20, 1911 |